Figure 1:
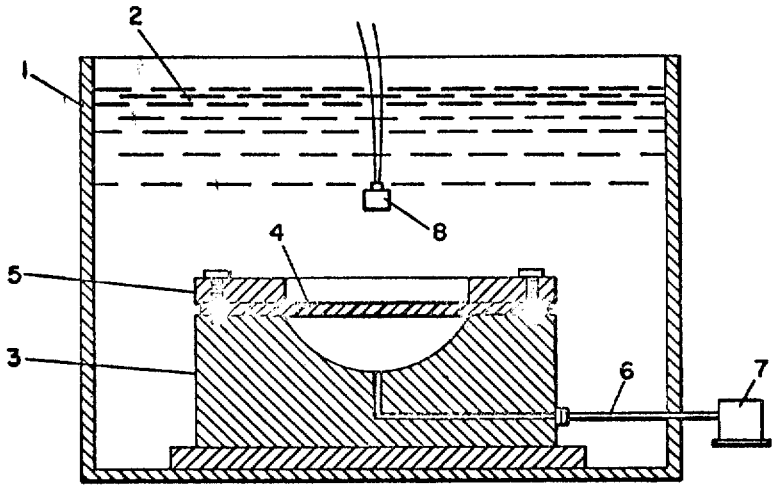
Figure 2:
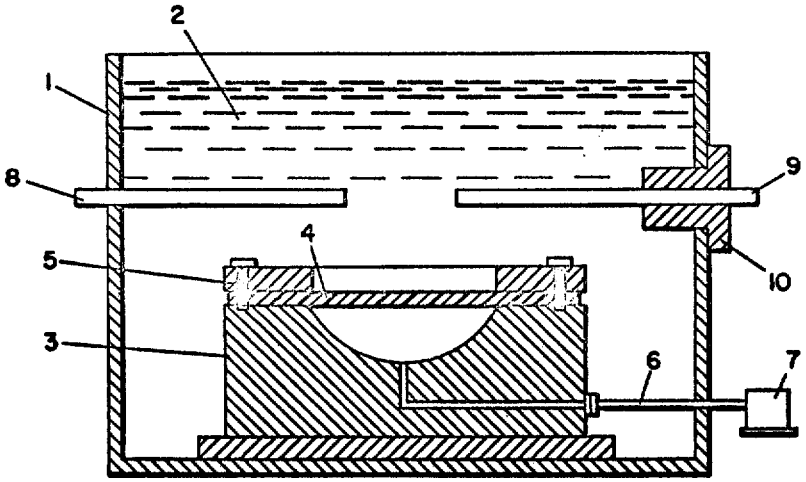

264-84
FIP7907 OR T 857,034 SR

DEC 17 1968

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 17, 1968

856 O.G. 697

713,769

FORMING SHAPED POLYMER ARTICLES

Jack R. Knox, Wilmington, Del., assignor to Hercules Incorporated, Wilmington, Del., a corporation of Delaware Filed Mar. 18, 1968. Published Dec. 17, 1968
Class 260—93.7
1 Sheet Drawing. 11 Pages Specification

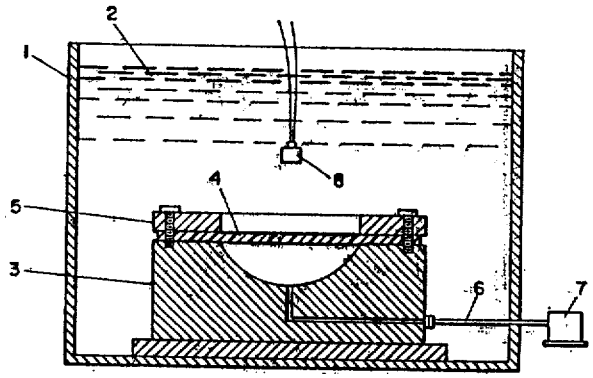

Crystalline propylene polymer sheets can be formed into various shapes while maintaining their strength and clarity by high energy rate forming.

In the process of forming a shaped propylene polymer a force of at least about 5000 p.s.i. at a velocity of at least about 1100 feet per second for a maximum time interval of about 50 microseconds will be applied to the polymer forcing it into a forming die having a configuration to impart the desired shape. Any of several techniques which generate high pressure at high velocity for very short intervals can be used. Examples of such techniques are detonation of an explosive in a liquid medium or producing a high voltage spark discharge in a liquid medium.

Most preferably the polymer will be biaxially oriented and can be in the form of a single sheet or a plurality of thin sheets. If desired a bridged polymer, i.e. one that has been treated with a small amount (from about 0.02% to 0.08% by weight) of an azido bridging agent, can be used. Typical azido bridging agents are the polysulfonazides and the polyazidoformates.

264-84 SR

FIP7907 OR T 857,034

JACK R. KNOX
INVENTOR.

BY Marion C. Staves

ATTORNEY